No. 807,243. PATENTED DEC. 12, 1905.
R. E. CHAPIN.
SELF CLOSING HOSE COCK OR VALVE.
APPLICATION FILED MAR. 14, 1904.
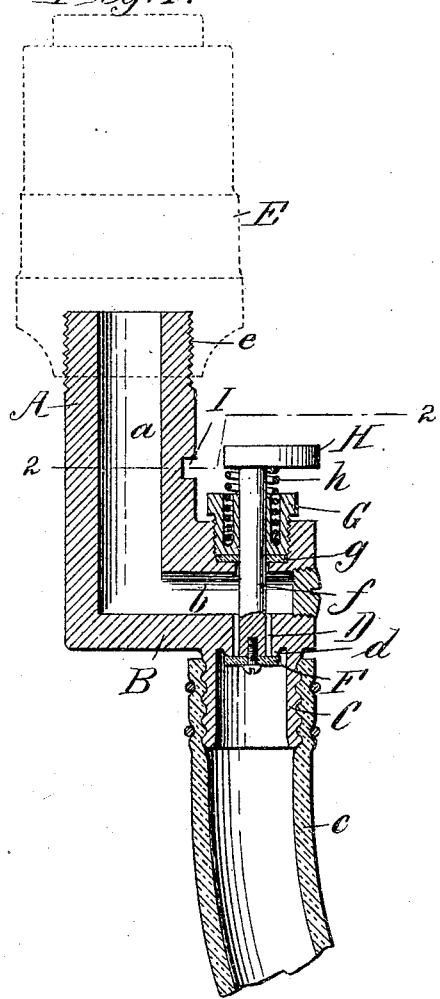
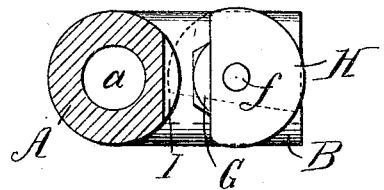
Witnesses:—
E. A. Vock.
R. W. Rumser
Inventor
by R. E. Chapin
Wilhelm, Parker & Hald
Attorneys.

UNITED STATES PATENT OFFICE.

RALPH E. CHAPIN, OF BATAVIA, NEW YORK.

SELF-CLOSING HOSE COCK OR VALVE.

No. 807,243.        Specification of Letters Patent.        Patented Dec. 12, 1905.

Application filed March 14, 1904. Serial No. 198,018.

*To all whom it may concern:*

Be it known that I, RALPH E. CHAPIN, a citizen of the United States, residing at Batavia, in the county of Genesee and State of New York, have invented new and useful Improvements in Self-Closing Hose Cocks or Valves, of which the following is a specification.

This invention relates to a self-closing hose cock or valve more especially applicable to devices employed for spraying or distributing liquid insecticides on trees, plants, and shrubbery. In such devices the liquid insecticide is commonly contained in a reservoir or tank, from which it is forced through a suitable hose and distributing-nozzle by the pressure of air compressed in the reservoir or tank. The liquid is more or less expensive, and necessarily only a limited quantity can be carried about in the device, so that it is highly desirable to prevent its waste while the operator moves from one plant to another or shifts the nozzle to change the direction of the spray from place to place.

The object of the invention is to provide a self-closing cock or valve for the hose or nozzle of simple and inexpensive construction, which is located for convenient operation by the thumb or finger of the hand holding the nozzle to permit the discharge of the liquid, and which is automatically closed when released to shut off the liquid and prevent the waste thereof, and which can be readily secured in open position when desired to relieve the operator from the necessity of holding the cock or valve open.

In the accompanying drawings, Figure 1 is a longitudinal sectional elevation of a hose cock or valve embodying the invention. Fig. 2 is a transverse section thereof, partly in plan, in line 2 2, Fig. 1.

Like letters of reference refer to like parts in both figures.

The body or barrel of the cock or valve is preferably formed in one piece with a main longitudinal discharge tube or barrel A, a lateral intermediate portion B, and a tubular inlet portion or nipple C, which is parallel with but offset from the discharge-tube and is suitably shaped for connection with a hose or pipe *c*. The discharge-tube and offset portion are hollow or provided with passages *a* *b*, respectively, in direct connection, and the latter passage connects with the passage of the nipple by a short passage or port D, which is parallel and concentric with the bore of the nipple and is surrounded at its inlet end or in the nipple with an annular valve seat or lip *d*. The end of the discharge-tube is screw-threaded at *e* for the attachment of a nozzle E (shown by dotted lines) of any suitable form for producing the desired character of spray or jet of the liquid.

F represents a valve arranged on the inlet side of the valve-seat *d* and preferably consisting of a disk, of leather or other suitable material, secured to the inner end of a valve-stem *f*, which projects forwardly out of the offset portion of the valve-body parallel with and alongside of the discharge-tube. The valve-stem passes through the port D and is of smaller diameter than the same to permit the passage of the liquid through said port when the valve is off of its seat. The valve-stem passes through a suitable stuffing-box consisting of a packing-gasket *g*, located in a cavity in the offset portion of the valve-body around the valve-stem, in which it is held and compressed around the valve-stem by a tubular plug G, screwed into the cavity, which is internally screw-threaded for this purpose.

The valve-stem is provided at its outer end with a suitable operating-head or enlargement H, and the valve is normally held to its seat to shut off the liquid by a coil-spring *h*, located in an annular pocket in the plug of the stuffing-box and bearing at its outer end against the head of the valve-stem.

The head of the valve-stem is preferably of segmental circular shape, as shown in Fig. 2, or is eccentrically secured to the stem, and the discharge-tube is provided on the side adjacent to the valve-stem with a notch I, with which the head of the valve-stem can be engaged when the valve is opened to hold it open by turning said head partially around, as indicated by dotted lines in Fig. 2. Instead of the notch any other suitable stop on the discharge-tube would accomplish the same result.

The location of the valve-operating stem and head is such that the operator can hold the device in the hand in a natural easy position, with his thumb on the head of the valve-stem, and open the valve as desired by a slight pressure on the head. As soon as the pressure is relieved the valve will be closed by its spring and will be held to its seat to shut off the liquid by the pressure thereof on the valve-disk, assisted by the valve-spring. The head of the valve-stem can also be easily turned to engage the head in the notch of the discharge-tube to hold the valve open by a twisting movement of the thumb. The spring $h$ not only seats the valve, but being compressed when the valve is opened it exerts its pressure to hold the head of the valve-stem against the stop and prevent the accidental disengagement of the head in handling the device. The device is thus exceedingly simple and convenient in use, being a great improvement over a construction in which the nozzle must be held in one hand and the valve operated by the other hand.

While the device is especially adapted for use in connection with liquid-insecticide sprayers, it is not necessarily limited to such application.

I claim as my invention—

1. The combination of a valve-body having an inlet-nipple for attachment to a hose or the like, and a discharge-tube which is substantially parallel with and offset relative to said nipple, a stop on one side of said discharge-tube, a valve in said valve-body, a valve-stem which is slidable longitudinally in said valve-body and extends out of the same beside said discharge-tube, a head carried by the outer end of said valve-stem for moving the latter to open the valve and which is adapted to be moved into engagement with the stop on said discharge-tube to hold said valve open, and a spring for seating said valve to close the passage of the body and holding said head against said stop, substantially as set forth.

2. The combination of a valve-body having a nipple for attachment to a hose or the like, and a discharge-tube which is substantially parallel with and is offset relative to said nipple and is provided with a notch in one side, a valve-stem which is slidably mounted in said valve-body and extends out of the same parallel with and beside said discharge-tube, a valve carried by the inner end of said valve-stem and controlling the liquid passage through said body, a head on the outer end of said stem which is movable longitudinally beside said discharge-tube and is adapted to be turned into engagement with said notch in the discharge-tube to hold the valve open, and a spring for seating said valve, substantially as set forth.

Witness my hand this 5th day of March, 1904.

RALPH E. CHAPIN.

Witnesses:
 ALICE H. DAY,
 W. G. PECK,
 LAURA M. KEEHN.